C. A. DANIEL.
MECHANISM FOR CURING LONG LENGTH RUBBER HOSE.
APPLICATION FILED AUG. 5, 1912.
1,222,604.
Patented Apr. 17, 1917.
4 SHEETS—SHEET 4.
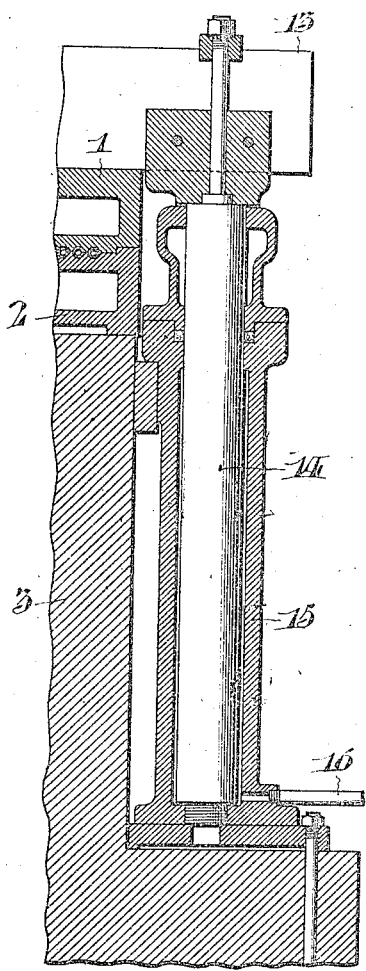
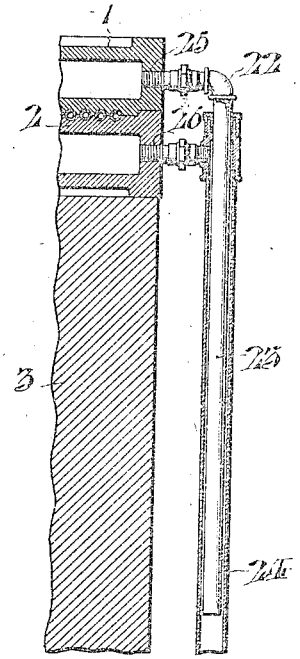

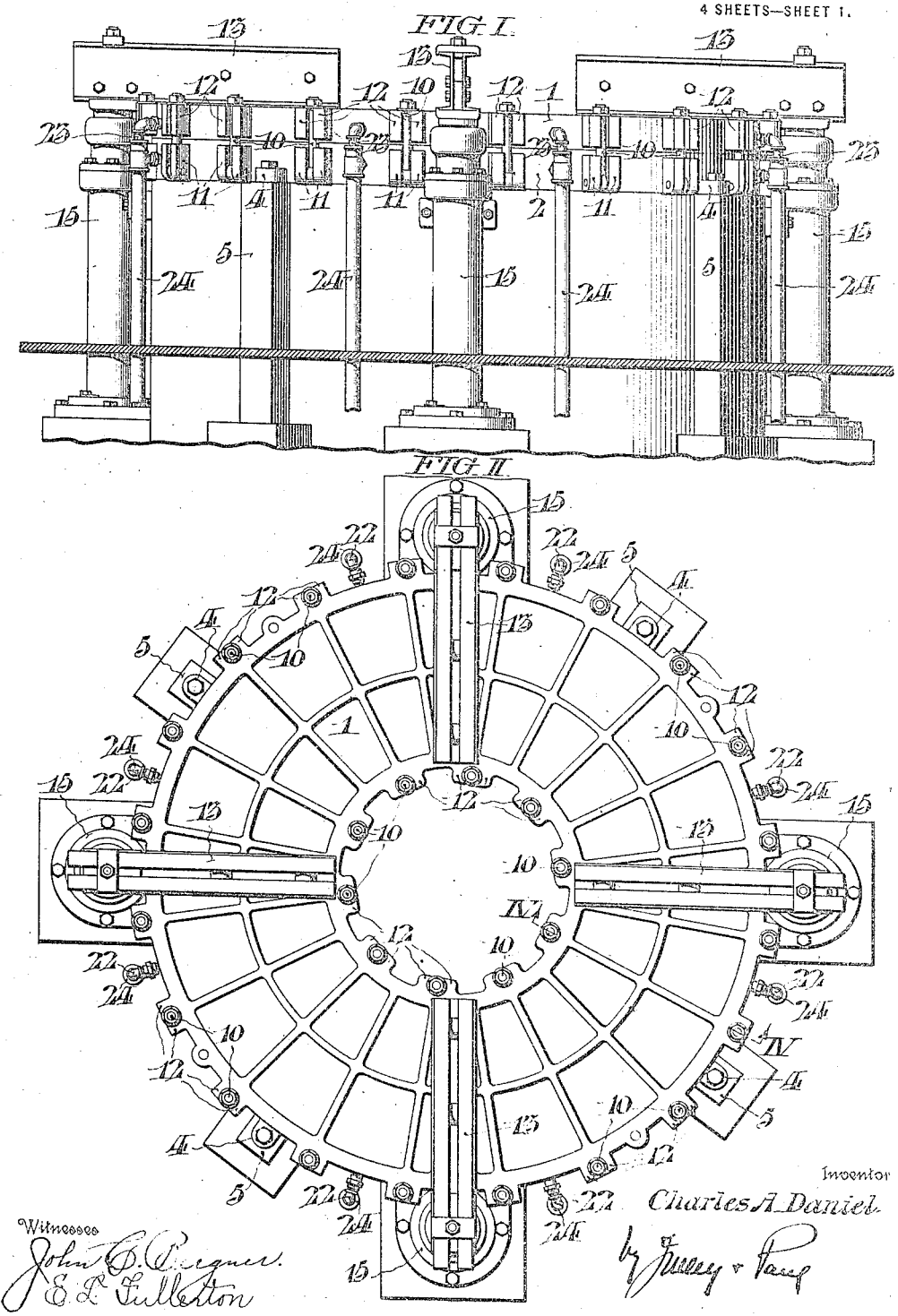

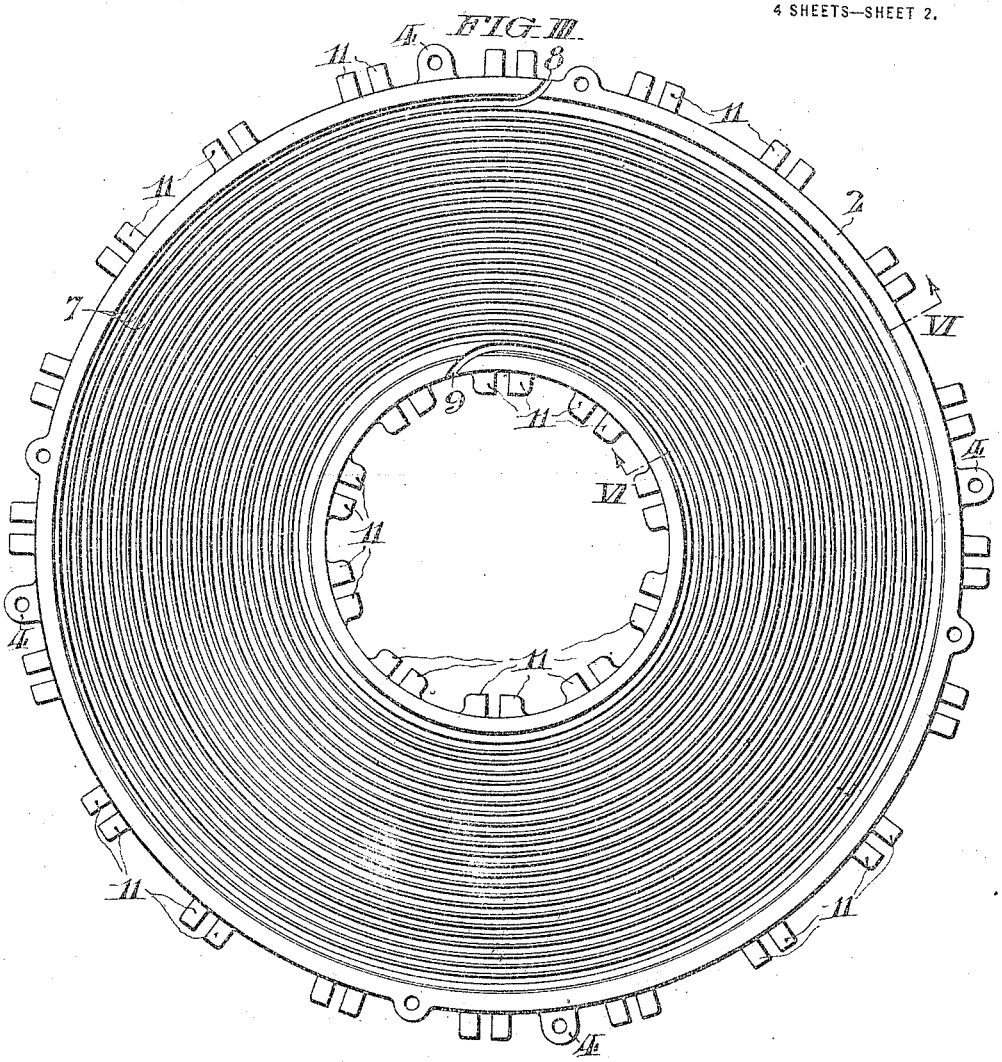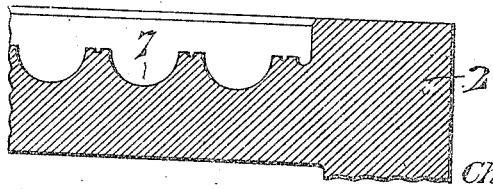

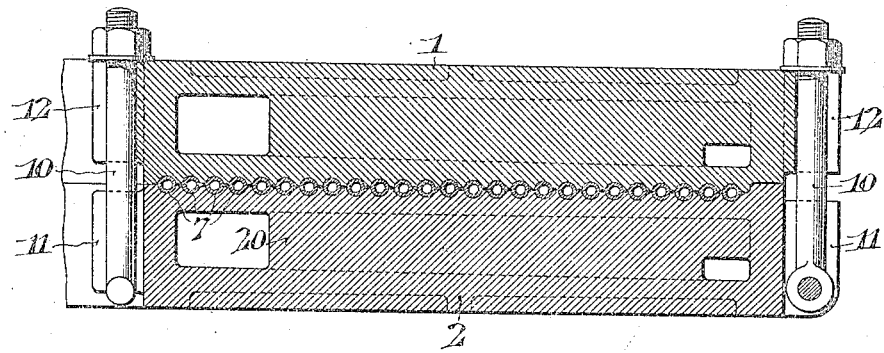
FIG. IV.
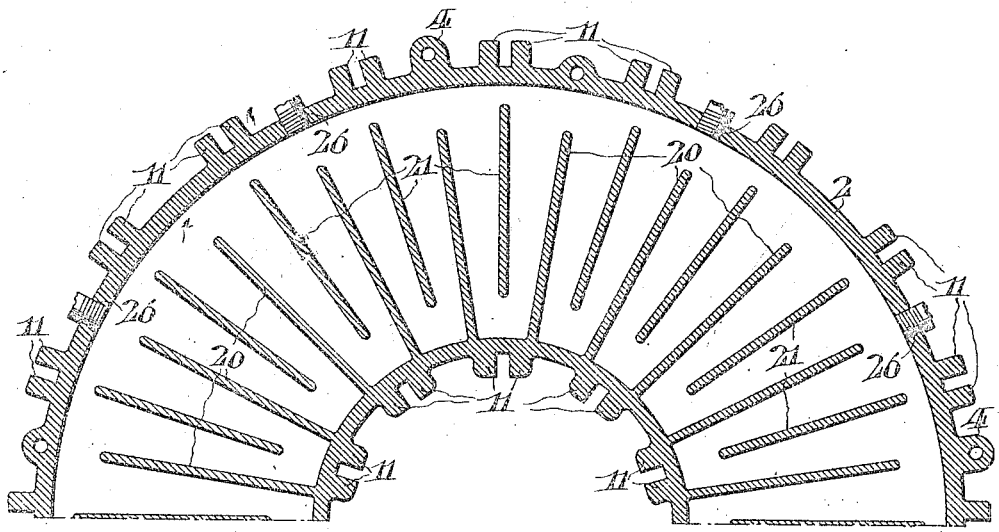
FIG. V.

UNITED STATES PATENT OFFICE.

CHARLES A. DANIEL, OF PHILADELPHIA, PENNSYLVANIA.

MECHANISM FOR CURING LONG-LENGTH RUBBER HOSE.

1,222,604.

Specification of Letters Patent.

Patented Apr. 17, 1917.

Application filed August 5, 1912. Serial No. 713,247.

*To all whom it may concern:*

Be it known that I, CHARLES A. DANIEL, of Philadelphia, in the county of Philadelphia and State of Pennsylvania, have invented certain new and useful Improvements in Mechanism for Curing Long-Length Rubber Hose, whereof the following is a specification, reference being had to the accompanying drawings.

The curing or vulcanizing of the surface of rubber hose has hitherto been effected only with comparatively short lengths, (fifty or sixty feet), or where the attempt has been made to cure long lengths of hose, the curing has been effected sectionally, with the result that the whole length of hose is not simultaneously and similarly cured. By the mechanism which I have devised, I have rendered it possible to cure a long length of hose, say five hundred feet or over, at one operation.

My device consists of two large steam-heated plates, with complementary spiral grooves formed on their opposing surfaces, together with means for manipulating one of the plates, and means for maintaining during such manipulation, steam or water connections with both the plates whereby the temperature thereof is properly regulated.

I prefer that the plates should be annular and their large size permits the formation of a continuous spiral groove five hundred feet or more in length to receive the hose, so that the entire long length of hose may be cured at one and the same operation.

In the accompanying drawings, Figure I, is an elevation, and Fig. II, a plan view of my device.

Fig. III, is a plan view of the lower plate on an enlarged scale showing the spiral groove on its upper surface.

Fig. IV, is a vertical sectional view along the line IV, IV, in Fig. II.

Fig. V, is a horizontal sectional view through the hollow interior of the plate.

Fig. VI, is a partial vertical sectional view along the line VI, VI, of Fig. III, on an enlarged scale.

Figs. VII, and VIII, are detail views showing respectively the vertical cylinders by which the movement of the upper plate is controlled and the continuous connections with the interior of the plates.

My mechanism consists essentially of a large press comprising two plates 1, and 2, of which the upper plate 1, is movable and the lower plate 2, is fixed. The plates are annular and the lower plate 2, is mounted upon a base 3, to which it is firmly attached by lugs 4, 4, bolted to the top of the columns 5, 5, which surround the base 3.

The upper surface of the lower plate is recessed centrally to receive the correspondingly projecting member of the other plate, and within the recess is formed upon it a long continuous spiral groove 7, as best seen in Figs. III, and VI. At the inner and outer extremities of the groove, it is turned in or out to the periphery of the plate, as seen at 8, and 9, in Fig. III, respectively.

The upper plate 2, is complementary to the lower plate and contains a similar or corresponding groove, so that when the plates are combined the two grooves form a continuous channel capable of receiving and curing a continuous length of rubber hose laid in the grooves. The upper plate is bolted to the lower plate by swivel bolts 10, swinging in lugs 11, 11, at intervals around the periphery of the lower plate and receivable between the lugs 12, 12, around the periphery of the upper plate.

To raise and lower the upper plate, there are attached to the top of the plate radial beams 13, 13, the extremities of which project beyond its periphery and have bolted to them vertical plungers 14, which are received within cylinders 15, which surround the base 3, and are operated by fluid pressure introduced by the pipes 16.

Both of the plates are hollow, their hollow interiors being provided with alternating baffle plates 20, and 21, having a configuration best shown in Figs. IV, and V, of the drawings, and resulting in the proper distribution of steam or water circulation through the interior of the plates. This steam or water for regulating the temperature of the plate is introduced through apertures 25, 26, formed at intervals around the periphery of both plates. To each of the apertures 25, there is attached piping with an elbow 22, fitted with a downward extension 23, which is received within the vertical stand pipe 24, of which there are a series surrounding the machine and communicating also with the apertures 25. The pipe 23, enters the pipe 24, through a stuffing box, and is long enough to permit of movement between the two pipes, without breaking the connection, of a sufficient extent to permit the raising and lowering of the upper plate without interference with the supply of steam or water to the upper plate.

The operation of my mechanism is as follows:

The hose having been already manufactured, and coated with vulcanizable material, is laid continuously within the spiral groove. The upper plate is then lowered upon the other plate and one extremity of the hose closed while to the other great pressure is applied extending through the interior of the hose and driving its outer surfaces against the spiral grooves within which it lies. This application of fluid pressure to the interior of the hose, while it lies in the grooves between the plates, is readily made, because the continuous spiral cylindrical channel in which the hose lies, terminates at its end at the periphery of the plates, so that the hose is accessible at this end for the application of internal pressure.

At the same time the temperature of the plates is raised by the proper application of steam or water to effect the curing or vulcanizing of the material under the pressure to which the interior of the hose is subjected, and by the combination of pressure and temperature thus supplied, the material is cured. The curing is thus performed at one operation, is uniform throughout, and a very much superior quality of long length hose is thus produced than can be turned out by other machines or methods of manufacture.

Having thus described my invention, I claim:

A mechanism for curing long lengths of rubber hose, comprising in combination opposed horizontally disposed upper and lower plates, the opposed faces of said plates being formed with complementary spiral grooves for receiving the hose, heating means for each plate, means for introducing fluid pressure into said hose, and elevating means for the upper plate to permit the bodily placing or removal of the hose in the groove of the lower plate, said means comprising a plurality of arms secured to and extending beyond the periphery of the upper plate, and pressure actuated plungers coöperating with said outwardly extending ends of said arms.

In testimony whereof I have hereunto signed my name at Philadelphia, Pennsylvania, this second day of August 1912.

CHARLES A. DANIEL.

Witnesses:
 AGNES REID,
 E. L. FULLERTON.